March 24, 1942.　　　E. W. GLACY　　　2,277,585
COASTER BRAKE
Filed June 14, 1940　　　2 Sheets-Sheet 1

INVENTOR:
EDWARD W. GLACY,
BY Romeyn A. Spare
HIS ATTORNEY.

March 24, 1942.  E. W. GLACY  2,277,585
COASTER BRAKE
Filed June 14, 1940  2 Sheets-Sheet 2

INVENTOR:
EDWARD W. GLACY,
BY Romeyn G. Spare
HIS ATTORNEY.

Patented Mar. 24, 1942

2,277,585

UNITED STATES PATENT OFFICE 2,277,585

COASTER BRAKE

Edward W. Glacy, Bristol, Conn., assignor to General Motors Corporation, Detroit, Mich., a corporation of Delaware Application June 14, 1940, Serial No. 340,445

6 Claims. (Cl. 192—6)

This invention relates to coaster brakes and their mountings.

An object of this invention is to provide an improved coaster brake mechanism of simplified construction and especially applicable to the crank hanger of a velocipede, bicycle or the like. Another object of this invention is to provide a driving, coasting and braking unit that embodies improved features, and which is so constructed that it may be easily and removably mounted in unit-handling relation in a velocipede crank hanger.

To these ends and also to improve generally upon devices of this character, this invention consists in the various matters hereinafter described and claimed. In its broader aspects, the invention is not necessarily limited to the specific illustrated construction wherein:

Figure 1:
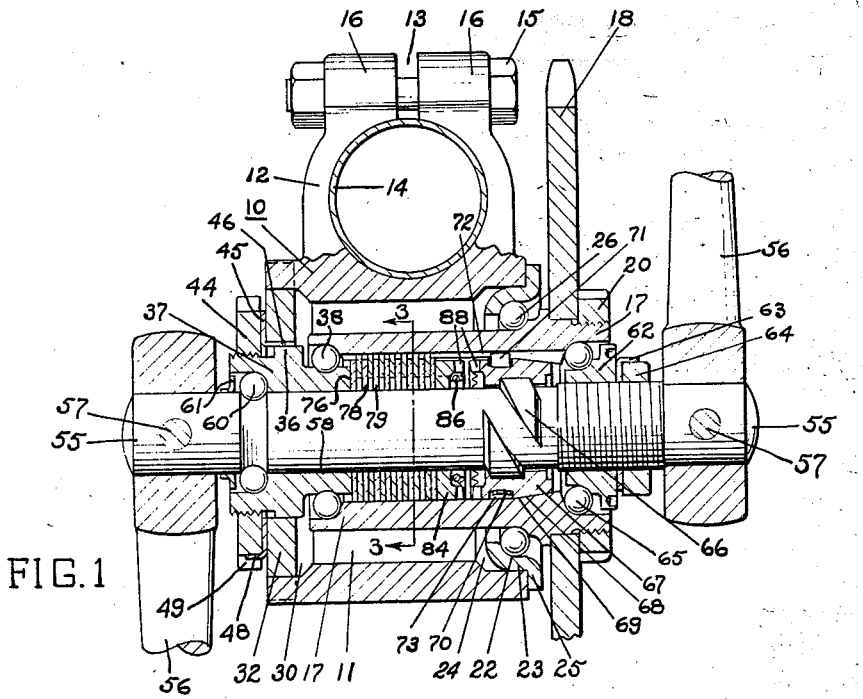
Figure 1 is a substantially diametrical sectional view showing the coaster brake mounted in a velocipede crank hanger.
Figures 2, 3:
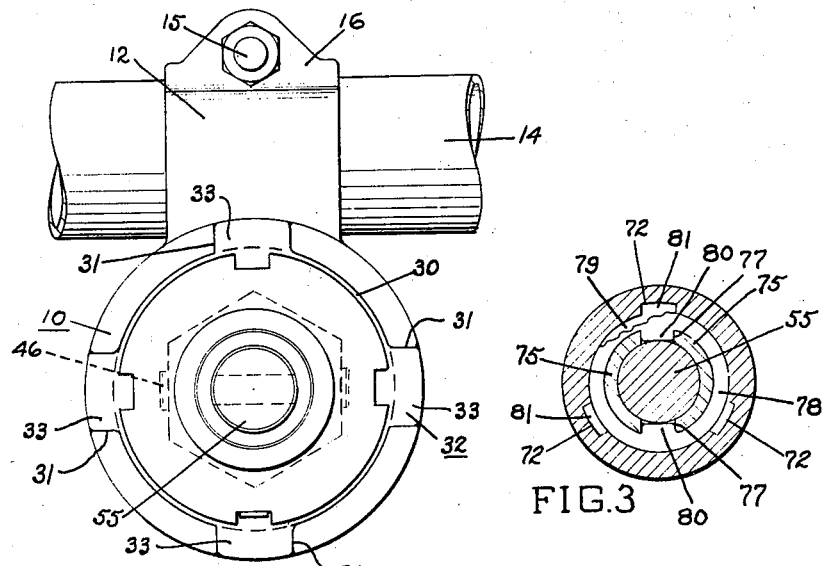
Figure 2 is an end elevation of the coaster brake mounted in the crank hanger.
Figure 3 is a sectional view taken along the line 3—3 of Figure 1.
Figures 4, 5:
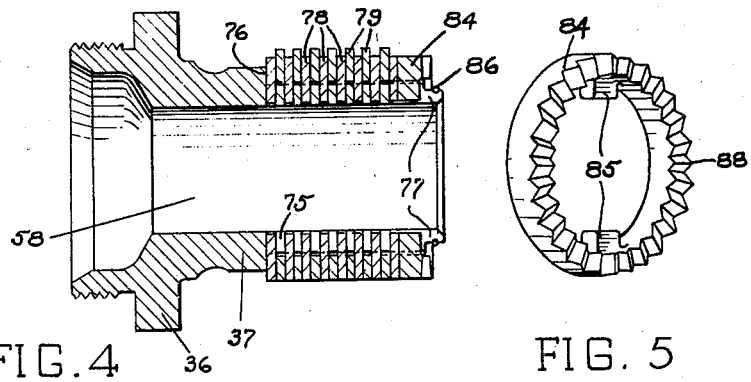
Figure 4 is a longitudinal section through the braking assembly.
Figure 5 is a perspective view of the brake actuating ring.
Figure 6:
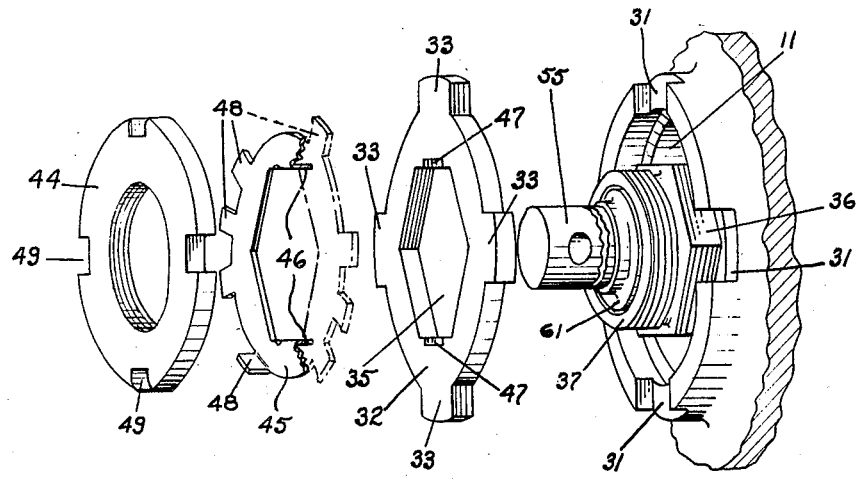
Figure 6 is an exploded perspective view showing the parts which removably secure the coaster brake in unit-handling relation in the crank hanger.

My improved coaster brake is demountably secured as a unit within the transverse bore 11 of a crank hanger 10 that has an upper sleeve portion 12 longitudinally split by a slot 13 and clamped to the tubular frame member 14 of a velocipede by a bolt 15 which extends through and is clamped against the two upstanding ears 16 on the sleeve portion 12 and spaced apart by the slot 13. If desired, the crank hanger may comprise an integral part of the velocipede frame as in the frame structure of many bicycles.

The coaster brake parts are contained in a rotatably driven shell 17 that has the driving sprocket 18 keyed thereto and removably secured against a shoulder by a nut 20 threaded on the shell. An antifriction bearing 22, which rotatably supports the shell 17 adjacent the sprocket 18, has an outer race ring 23 removably seated in the crank hanger counterbore 24, and the race ring flange 25 abuts the end of the hanger 10 to axially locate this race ring. Rolling elements, such as the balls 26, are in rolling contact with raceways respectively formed in the race ring 23 and in the shell 17.

The other end of the crank hanger 10 has a counterbore 30 that is peripherally interrupted by one or more substantially radially disposed slots 31 that extend through the end of the crank hanger wall, and an anchor disc 32, which removably and axially fits within the counterbore 30, has one or more radially projecting lugs 33 correspondingly positioned to and interfitting within the slots 31 to restrict this anchor disc 32 from rotation. A centrally disposed non-cylindrical aperture 35 which extends through the anchor disc 32 matingly receives and non-rotatably supports a flange 36 on a brake disc or anchoring sleeve support 37 which extends into and rotatably supports the left end of the shell 17 by a row of bearing balls 38 in rolling engagement with raceways respectively formed in the shell 17 and in the support 37 as illustrated in Figure 1 of the drawings. In the present showing, the flange 36 and the aperture 35 are provided with hexagonal interfitting contours. A spanner nut 44, threaded on the outer end of the brake disc support 37, removably secures the coaster brake as a unit in the bore 11, and this nut 44 may be turned in adjustable thrust relation with the anchor disc 32 to adjust the ball bearing 22. A lock washer 45, between the nut 44 and the anchor disc 32, has internally disposed laterally projecting ears 46 received in the anchor disc slots 47, and a plurality of radially projecting ears 48 are so peripherally spaced on the washer 45 that at least one of these ears 48 may be laterally bent over into locked relation with one of the spanner slots 49 to non-rotatably and removably lock the nut 44 in adjusted position relative to the anchor disc 32.

A crank or pedal shaft 55 passes through the shell 17 and has the pedal arms 56 respectively and removably secured to its ends in driving relation by the pins 57. The left-hand end of the shaft 55 as viewed in Figure 1 freely extends through an axial bore 58 in the brake disc support 37 and is rotatably supported by a row of balls 60 in rolling contact with raceways respectively formed in the shaft 55 and in the outer end of the support 37. A shield 61, pressed over the shaft 55, serves to restrict the leakage of lubricant and prevents the entrance of dust and deleterious matter into the chamber containing the balls 60. An inner race ring 62, threaded on the right-hand end of the shaft 55, as viewed in Figure 1 and clamped in adjusted position by a lock washer 63 and a nut 64, is rotatably supported by a row of balls 65 that engages the raceways respectively formed on the race ring 62 and in the shell 17.

The portion of the pedal shaft adjacent to the race ring 62 has a short length of steep threads 66 mating with the threads in an axially shiftable nut 67 that is provided with an externally conical clutch surface 68 arranged for wedged driving engagement against a similar conical face 69 on the shell 17. If desired, the conical face 68 may be serrated to aid the frictional driving engagement of the nut 67 against the hub shell. A C-shaped lag spring 70, provided with the out-turned ends 71 that are slidably and respectively received in two of the longitudinally disposed keyways 72 in the shell 17, frictionally embraces the nut 67 in the peripheral groove 73.

A reduced sleeve portion 75 on the brake support 37 extends from a shoulder 76 towards the nut 67, and this sleeve portion is cut through its length by one or more slots 77. Inner and outer brake discs 78 and 79 are slidably mounted on the sleeve portion 75 in alternating relation, the inner discs being non-rotatably and axially slidably keyed to the slots 77 by the lugs 80 and the outer discs being axially slidably keyed to the hub keyways 72 by the lugs 81 so that the alternating discs are constrained to rotate only with the member to which the discs are keyed. A brake actuating ring 84 slidably mounted on the outer end of the sleeve 75 beyond the end brake disc, has the inwardly projecting lugs 85 slidable in the slots 77, and the brake discs and actuating ring 84 are loosely secured in unit-handling assembled relation with the support member 37 by a snap ring 86 removably engaging a peripheral groove at the outer end of the sleeve portion 75. The nut 67 and the actuating ring 84 are respectively provided with the laterally opposed clutch teeth 88 that are only in engagement during a braking operation when the pedals are pushed counter-clockwise.

In operation, in forward driving, the nut 67 is axially shifted by the threads 66 into wedged driving engagement with the shell 17 so that the pedal shaft 55, the nut 67 and the shell 17 turn as a unit. When coasting, the shaft 55 is held stationary and the nut 67 shifts away from the conical hub surface 69 but not sufficiently far to engage the clutch teeth on the actuating ring 84. In this coasting position, the shell 17 and the outer brake discs 79 turn freely since the brake discs are not in braking engagement. When the pedals are urged backwardly during braking, the threads 66 shift the nut 67 into clutching engagement with the brake actuator 84, and as further backward pressure is applied to the pedals the nut 67 forces the actuator 84 towards the shoulder 76 to exert the desired braking pressure between the hub rotated discs 79 and the discs 78 that are held non-rotatable by the support 37 that is interlocked with the anchor disc 32 which is non-rotatably keyed to the crank hanger 10.

I claim:

1. In a device of the character indicated, a crank hanger having a through aperture, a bearing removably seated in one end of said aperture, a shell removably and rotatably supported at one end within said bearing, a sleeve member extending into and rotatably supporting the other end of said shell, and an anchoring disc non-rotatably socketed in the crank hanger at the other end of said aperture and serving as the sole support for said sleeve member.

2. In a device of the character indicated, a crank hanger having a through aperture, one end of the hanger having a transverse slot opening into one end of said aperture, an anchoring disc removably and peripherally seated in said aperture, an outwardly extending lug on the anchoring disc matingly received in said slot, a unit-handling coaster brake removably socketed and supported at one end in said anchoring disc, and a bearing seated in the other end of said aperture and supporting the other end of said coaster brake.

3. In a device of the character indicated, a crank hanger having a through bore and provided with transverse end slots interrupting one end of said bore, an anchoring disc removably and peripherally seated in the slotted end of the bore, peripherally disposed lugs on the disc matingly received in said slots, a shell in said bore, a bearing at the other end of the bore surrounding and rotatably supporting said shell, a shell-supporting sleeve removably socketed in and supported by the anchoring disc, means securing the sleeve and shell in unit-handling relation and an adjustment nut removably threaded on the sleeve for adjusting said bearing and for demountably securing the shell and sleeve in said bore.

4. In a device of the character indicated, a crank hanger having a through aperture, a unit-handling coaster brake, a bearing demountably seated in one end of the crank hanger aperture and rotatably and peripherally supporting one end of said coaster brake, a supporting member extending into and rotatably supporting the other end of said coaster brake, and an anchoring disc demountably and non-rotatably seated in the other end of said crank hanger aperture and non-rotatably carrying said support member.

5. In a device of the character indicated, a crank hanger having an aperture therethrough, a coaster brake assembly, a rotatable shell forming part of said coaster brake and having an external raceway near one end, an outer race ring demountably seated in one end of the crank hanger aperture, rolling elements engaging said raceway and said race ring, a member extending into and rotatably supporting one end of said shell, and an anchoring disc removably seated in the crank hanger and non-rotatably supporting said member.

6. In a device of the character indicated, a crank hanger having a through aperture, a crank shaft extending through said aperture, a rotatable shell within said aperture and located between the crank shaft and crank hanger, a raceway in the shaft at one end of said aperture, rolling elements in said raceway, a bearing member supporting said rolling elements and rotatably supporting one end of said shell, an anchoring disc demountably seated in the casing and non-rotatably supporting the bearing member between said raceway and said shell, and an antifriction bearing demountably seated in the other end of said casing aperture and rotatably and externally supporting the other end of said shell.

EDWARD W. GLACY.